(12) United States Patent
Mirza

(10) Patent No.: US 7,245,975 B2
(45) Date of Patent: Jul. 17, 2007

(54) SKEW COMPENSATION

(75) Inventor: Marghub Mirza, Milford, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 213 days.

(21) Appl. No.: 11/110,475

(22) Filed: Apr. 20, 2005

(65) Prior Publication Data

US 2006/0241789 A1    Oct. 26, 2006

(51) Int. Cl.
G05B 11/01    (2006.01)
G05B 19/18    (2006.01)
G05B 19/04    (2006.01)
G05B 6/02    (2006.01)
G06F 19/00    (2006.01)

(52) U.S. Cl. .................... 700/72; 700/3; 700/193; 700/254; 318/621; 901/20

(58) Field of Classification Search .............. 700/3, 700/54, 72, 193, 250, 254; 318/568.22, 621; 901/621, 1, 14, 15, 19, 20
See application file for complete search history.

(56) References Cited

U.S. PATENT DOCUMENTS

| | | | |
|---|---|---|---|
| 4,421,800 A | 12/1983 | Schoenberg et al. | 427/424 |
| 4,510,574 A * | 4/1985 | Guittet et al. | 700/260 |
| 4,706,456 A | 11/1987 | Backe et al. | 60/368 |
| 4,791,575 A * | 12/1988 | Watts et al. | 700/194 |
| 4,924,805 A | 5/1990 | O'Dea | 118/680 |
| 5,319,568 A | 6/1994 | Bezaire | 364/479 |
| 5,542,251 A | 8/1996 | Leibing et al. | 60/426 |
| 5,555,140 A * | 9/1996 | Kitamura et al. | 360/73.02 |
| 5,884,682 A | 3/1999 | Kennedy et al. | 144/357 |
| 6,375,433 B1 | 4/2002 | Du et al. | 417/53 |
| 6,426,984 B1 * | 7/2002 | Perino et al. | 375/356 |
| 6,554,956 B1 | 4/2003 | Dolan et al. | 156/441.5 |
| 6,625,498 B1 * | 9/2003 | Kurakake et al. | 700/3 |
| 7,062,005 B2 * | 6/2006 | Gresham | 375/375 |
| 7,123,547 B2 * | 10/2006 | Szajnowski | 367/124 |
| 2004/0105451 A1* | 6/2004 | Boduch et al. | 370/401 |
| 2004/0141187 A1 | 7/2004 | Johnston et al. | 356/608 |

* cited by examiner

Primary Examiner—Crystal J. Barnes
(74) Attorney, Agent, or Firm—Renner, Otto, Boisselle and Sklar, LLP

(57) ABSTRACT

A system and method for generating master and slave reference signals is disclosed, wherein at least one axis of the plurality of axes is a master section and at least one axis of the plurality of axes is a slave section, said slave section being a slave of said master section. The system and method generates a first reference signal and a second reference signal, wherein the second reference signal lags the first reference signal by a first delay period, and the processor provides the first reference signal to the slave section and the second reference signal to the master section. As a result, the slave section can lead the master section.

22 Claims, 5 Drawing Sheets

SKEW COMPENSATION

FIELD OF THE INVENTION

The present invention relates generally to motion control systems and, more specifically, to a system and method that compensates for dynamic delays inherent in motion control.

BACKGROUND OF THE INVENTION

Motion control systems are utilized to move, position and/or control one or more objects in a desired manner, and typically include a motion controller, a drive or amplifier, a motor, and mechanical elements. The motion controller acts as the intelligent portion of the system, providing control signals that, in conjunction with the drive, motor and mechanical elements, produce a desired motion or outcome.

Typically, control algorithms are implemented via software that resides within the motion controller. The motion controller, executing the software, outputs analog and/or digital control signals to the drive, which then amplifies the signals to a level usable by the motor. The motor converts the electrical energy provided by the drive to mechanical energy, which is applied to the mechanical elements to achieve a desired motion.

Although not required, a feedback device or a position sensor may be used in the motion control system to increase the accuracy of the desired motion. Typically, the feedback device is coupled to the motor shaft or to a component that is to be controlled by the motion controller. The feedback device, such as an encoder, a resolver, or the like, provides signals that can be used by the motion controller to sense and/or determine position and/or velocity of the motor shaft and/or of the object to be controlled. The feedback device can be used to close the loop to the motion controller, thereby providing increased accuracy of the overall system. Other types of position sensors, such as proximity switches, optical switches, or the like, also can be used to control or provide feedback as to the position of the moving object.

Further, the motion control system can include a plurality of drives and motors to allow multi-axis control of the movement of the object. Such multi-axis systems can control the motion of an object in two and/or three dimensional space.

In addition to moving an object in a controlled manner, the motion control system also should provide a desired level of performance in executing the motion profile. The specific level of performance required in the system is application specific, and can vary from machine to machine and industry to industry. Generally speaking, the motion control system should be stable, provide acceptable responses to input commands with a minimum steady-state error, and be able to eliminate the effect of undesirable disturbances. Additionally, multi-axis applications typically require a level of coordination between the individual axes to achieve a desired result.

For example, in a two-axis glue dispensing system, a material, e.g., paper or the like, receives a bead of glue as it passes beneath a glue head. In order to maintain a constant thickness of the bead of glue on the paper, the glue is dispensed at a rate proportional to the speed of the of the paper passing beneath the glue head. Thus, it is clear that as the speed of the material passing beneath the glue head is changed, the flow of glue also is changed. Failure to do so would result in the paper having a bead of glue that varies in thickness. To maintain a constant thickness of the glue bead, a level of coordination between a section controlling the speed of the material passing beneath the glue head and a section controlling the extrusion of glue is required.

A conventional approach to multi-axis motion control systems is to implement a master-slave configuration, wherein a lead axis (e.g., the master) serves as the command generator for one or more follower axes (e.g., the slaves). For example, in a speed follower system as the speed of the master is varied, the speed of one or more slave sections also is varied proportionally to the speed of the master. Assuming the slave controllers are modeled and tuned properly, then synchronization will occur between the master and slave sections. However, due to the dynamics of the system, such master-slave systems may not provide a desired result, as illustrated in the following example.

A three-axis glue dispensing machine dispenses a bead of glue on a two-dimensional flat surface, such as an envelope or box top. The system includes a first axis for controlling an X axis, a second axis for controlling a Y axis, and a third axis for controlling a pump. The first and second axes control the motion of a gantry, while the third axis controls the extrusion of glue from a glue head.

The speed of the gantry will change as it traces a path in two-dimensions, typically slowing down at sharp corners and speeding up along straight segments. In operation, it is desirable to maintain a constant thickness of the glue bead, no matter how fast or slow the gantry is moving. To maintain a constant thickness of the glue bead, the third axis is slaved off the vector velocity of the first and second axes (a master-slave configuration). Therefore, as the gantry varies in speed, the extrusion of glue will vary proportionally to the gantry speed.

Due to the dynamics of glue extrusion, however, some lag may be present in the response time of the third axis. This lag can be in the range of a few milliseconds to a few seconds, and can result in uneven application of the glue onto the envelope or box top. For example, as the gantry speed is quickly changed, the pump speed also is quickly changed. However, due to the dynamics of the glue and/or the pump, an increase or decrease in the output of glue may not be seen until some time after the pump speed has changed. This can result in a thin bead of glue during periods of high acceleration, and a thick bead of glue during periods of high deceleration.

Conventionally, feedforward control and/or derivative control, e.g., a PID controller, are implemented to compensate for the machine or process dynamics for single axis. Such implementations, however, can not compensate for large dynamics delays across multiple axes that are performing a tight co-ordinated motion.

SUMMARY OF THE INVENTION

The present invention improves over the prior art by providing a system and method that compensates for dynamic delays in motion control systems in a simple and intuitive manner. The invention generates virtual and actual reference signals for the master and/or slave sections.

The actual reference signal for the master sections are conditioned using a skew generator or the like, which introduces a delay into the actual master reference. The actual reference signal for the slave sections, however, may not be conditioned by the skew generator and, thus, a delay may not introduced into the actual slave reference. The actual master and slave reference signals may then be provided to the master and slave sections, respectively. As a result of the delay in the actual master reference signal, the slave sections lead the master sections, thereby allowing the slave sections to anticipate velocity and/or position changes of the master sections. Further, the skew generator can be implemented using a first-in first-out (FIFO) buffer. The FIFO buffer requires very little processor overhead and, therefore, can be executed in real time without placing a significant burden on the processor. Additionally, the skew generator can be enabled/disabled on the fly, and the delay time introduced by the skew generator also can be changed on the fly.

According to one aspect, there is provided a system and method for generating master and slave reference signals for a plurality of axes, wherein at least one axis of the plurality of axes is a master section and at least one axis of the plurality of axes is a slave section, said slave section being a slave of said master section. The system and method generates a first reference signal and a second reference signal, wherein the second reference signal lags the first reference signal by a first delay period. The first reference signal is provided to the slave section and the second reference signal is provided to the master section.

Preferably, the delay period is introduced using a first in, first out (FIFO) buffer, wherein the buffer receives the first reference signal and generates the second reference signal.

According to an embodiment of the invention, the delay signal is enabled or disabled on the fly, such that when the first delay signal is disabled, the second reference signal is substantially the same as the first reference signal. The enabling and disabling may be based on a specified criteria.

According to another embodiment of the invention, the first delay period is dynamically changed. Additionally, the change can be based on a specified criteria.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

Figure 1:
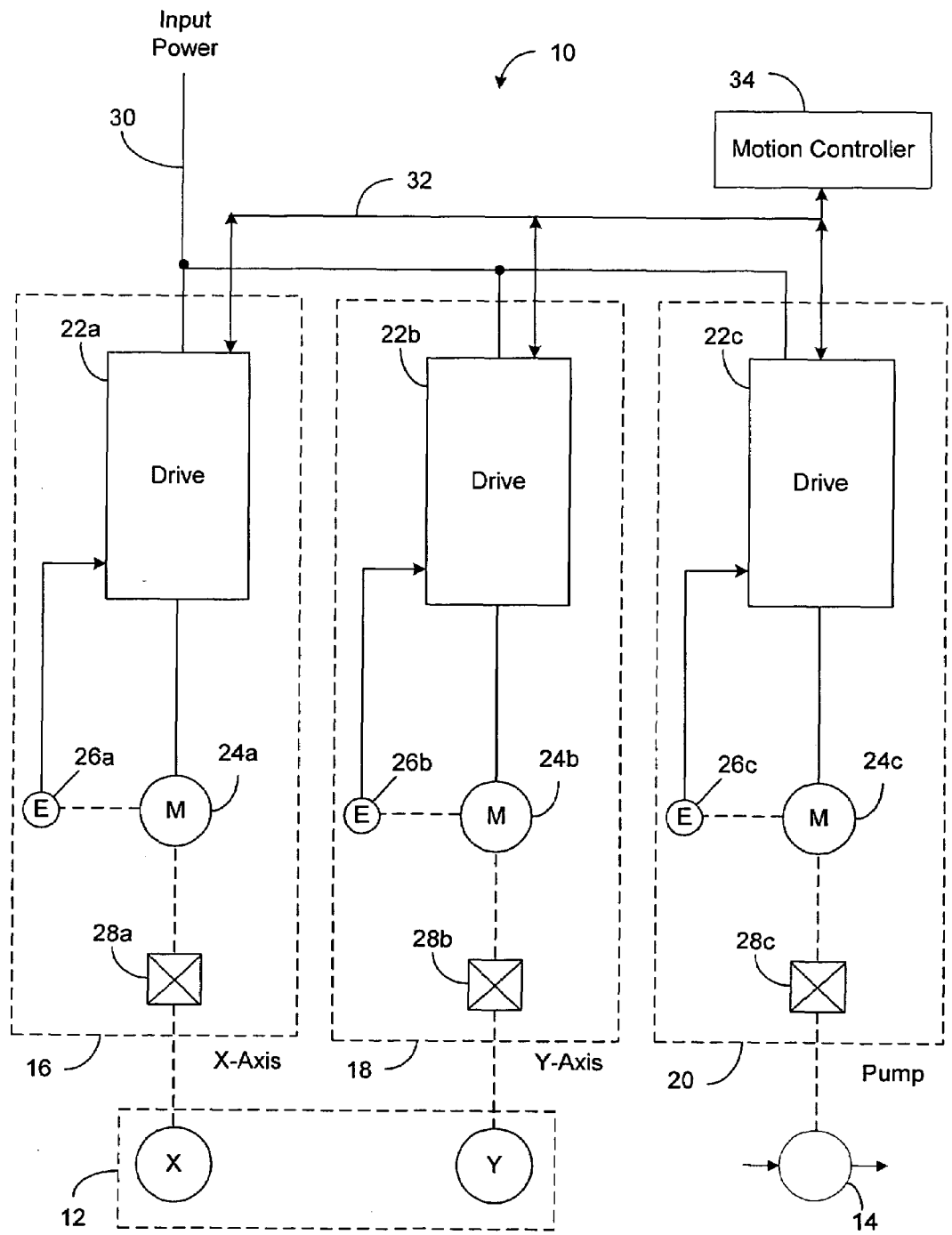
FIG. 1 is a block diagram of an exemplary control system that can be used to control a multi-axis system.

In the detailed description that follows, corresponding components have been given the same reference numerals, regardless of whether they are shown in different embodiments of the present invention. To illustrate the present invention in a clear and concise manner, the drawings may not necessarily be to scale.

The present invention relates to a system and method for generating reference signals in a motion control system. As used herein, a virtual motion profile or virtual motion refers to the generation of a reference signal, and an actual motion profile or actual motion refers to operating or regulating to the reference signal. Further, a master section refers to a lead section or a section that provides a reference to a follower section (e.g., a down stream section), and a slave section refers to a follower section that receives a reference from a lead section (e.g., an upstream section), as is conventional.

According to the present invention, a virtual motion profile and an actual motion profile are generated by a motion controller or the like for both master and slave sections. The actual motion profile for the master section is derived from a virtual master motion profile by introducing a delay or skew function into the virtual motion profile. The delay time shifts or skews the actual motion profile with respect to the virtual master motion profile, such that the actual motion profile is substantially the same as the virtual master motion profile but shifted in time so as to lag the virtual motion profile. The actual motion profile for the slave section is derived from a virtual slave motion profile, such that no delay (or a delay less than that introduced into the master section) is introduced into the actual motion profile.

The motion controller provides the time shifted motion profile to one or more master sections, and the motion controller provides the non-time shifted slave motion profile to one or more slave sections. As a result, the one or more slave sections lead their master sections. This is contrary to the conventional approach, wherein slave sections follow the master sections.

As will be appreciated, the present invention can be applied to any combination and number of axes, and any complex motion can be passed through the skew function. Further, each axis can be configured so as to have a different skew function from other sections, and the skew function can be enabled or disabled on the fly.

The present invention is advantageous in that it can compensate for dynamic delays inherent in moving objects, thereby improving the performance of the system. Further, the present invention is relatively easy to implement and configure and, thus, can be applied to new systems as well as existing systems.

Another advantage of the present invention is that it can be applied across multiple hardware platforms. For example, servo/stepper motors, pneumatic/hydraulic actuators, etc., each have different response times, delays and latencies. The skew function can be used to compensate for mechanical, electrical and fluid dynamic delays of such systems.

The above features of the present invention will now be described with respect to the drawings. It is noted that the present invention will be described in the context of a three-axis glue dispensing system, wherein a first and second axis (the X and Y axes, respectively) control the two-dimensional movement of a gantry having a glue dispenser mounted thereon. A third axis controls a pump, which extrudes glue from the glue dispenser onto a material, such as paper. As will be appreciated, the above glue dispenser is merely exemplary, and the present invention can be applied to numerous other motion control applications. Other exemplary applications include water jet, laser and pressure control applications, etc.

Referring initially to FIG. 1, an exemplary control system 10 for controlling the three-axis glue dispensing system is shown. The control system 10 controls the motion of a gantry 12, which directs the placement of a glue head (not shown) over the material, and a pump 14, which controls extrusion of glue from the glue head onto the material.

A first axis 16 controls an X direction of the gantry 12, a second axis 18 controls the Y direction of the gantry 12, and a third axis 20 controls the pump velocity, thereby controlling the extrusion of glue. Each axis 16, 18 and 20 includes a respective drive 22a, 22b, 22c, motor 24a, 24b, 24c, feedback device 26a, 26b, 26c (e.g., an encoder or the like), and gear reducer 28a, 28b, 28c. The drives 22a, 22b, 22c receive power from a power source 30 and, based on control signals 32 from a motion controller 34, convert the power to a level used by the respective motors 24a, 24b, 24c. Each motor 24a, 24b, 24c is coupled to a respective gear reducer 28, which provides the necessary gear reduction for each driven section of the glue dispensing system. A feedback device 26 is coupled to each respective motor 24 and provides a signal to each respective drive indicative of a speed and/or position of the motor shaft. The drive uses the feedback signal to precisely control the operation of the motor.

As will be appreciated by those skilled in the art, numerous other configurations of the motion control system 10 are possible. For example, the motion controller may reside within a drive itself, feedback signals from the feedback device may be routed to the motion controller or to both the motion controller and the drive, a feedback device may not be utilized, etc.

Figure 2:
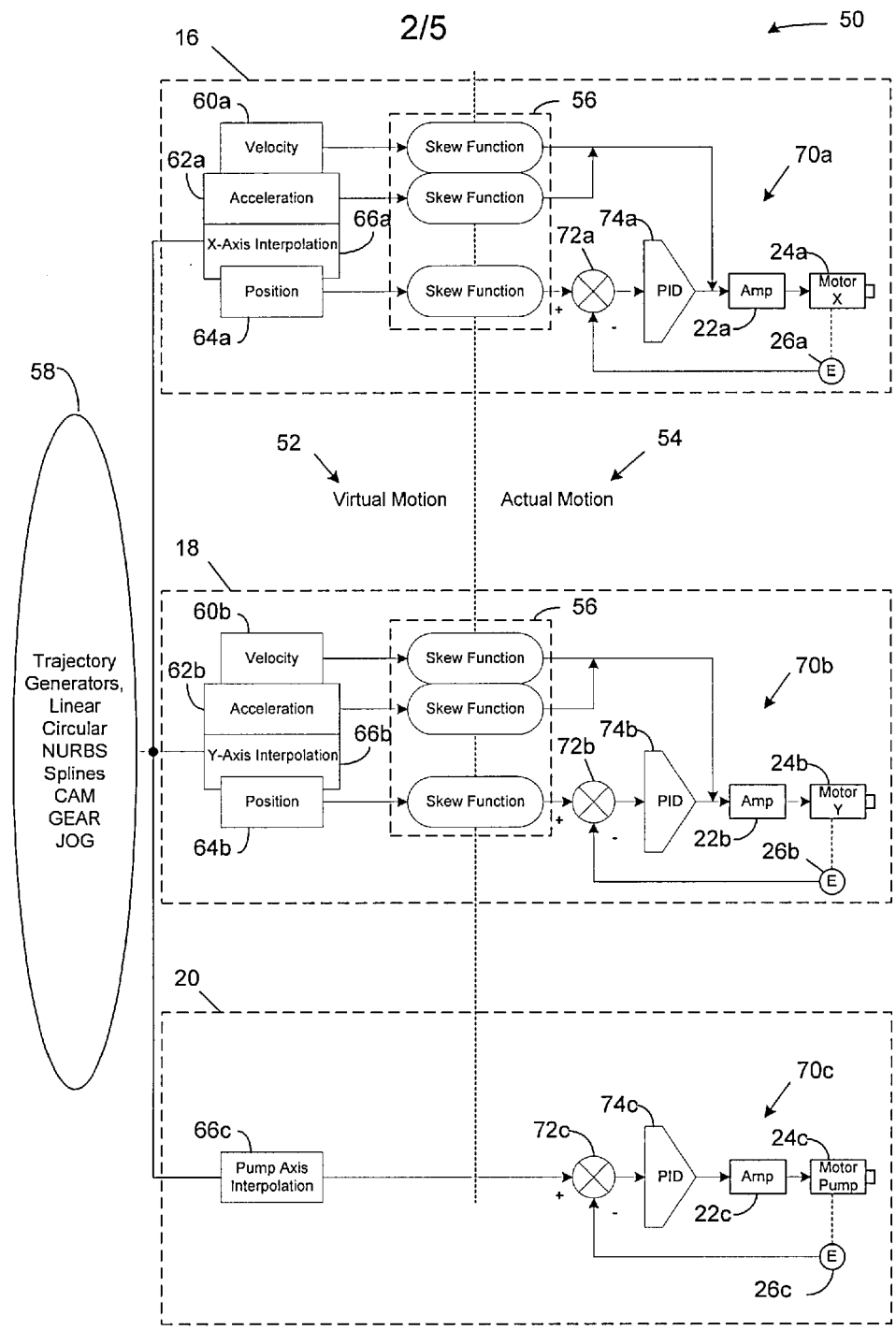
FIG. 2 is a block diagram of a control algorithm in accordance with the invention.

As was noted above, the motion controller 34 executes software to control the system 10 in a desired manner. FIG. 2 is a block diagram illustrating a software controller 50 in accordance with the present invention. The controller 50 includes sections for controlling each axis 16, 18, 20 of the three-axis system. More particularly, the controller 50 includes a virtual motion section 52, an actual motion section 54, and at skew generator 56 between the virtual and actual motion sections. As will be appreciated, the controller 50 can be applied to more or fewer sections than illustrated in the present example.

The virtual motion section 52 generates a motion profile for each axis 16, 18, 20 of the system 10 and includes a trajectory generator 58. The trajectory generator 58 may include a number of interpolation functions, such as linear or circular NURBS, SPLINES, CAM, GEAR and JOG functions, as is conventional. Based on move constraints provided by a user, the trajectory generator 58 creates new setpoints each loop period (i.e., each time the trajectory generator is executed). The move constraints can include, for example, the maximum velocity 60a, 60b of the section, the maximum acceleration/deceleration 62a, 62b of the section, and target position 64a, 64b for the section. As will be appreciated by those skilled in the art, other motion parameters also may be implemented.

As is conventional, interpolation is performed on the setpoints generated by the trajectory generator 58 to provide a smooth motion profile for each axis 16, 18, 20. The interpolation is performed by an axis interpolator 66a, 66b, 66c of each axis, which implements any one of the above-mentioned interpolation functions. The output of the master section interpolators 66a, 66b, provide the virtual master reference, while the output of the slave section interpolator 66c provides the virtual slave reference. As will be appreciated by those skilled in the art, the virtual slave reference is based on the virtual master reference, as is conventional in a master-slave configuration. In other words, the virtual slave reference is derived by conditioning the virtual master reference, wherein conditioning refers to applying a ratio, draw, function, or the like to the virtual master reference so as to obtain the virtual slave reference.

Moving now to the actual motion section 54, there is provided control loops 70a, 70b, 70c for each axis. The control loops 70a, 70b, 70c can be conventional control loops, including a summing junction 72a, 72b, 72c for receiving a setpoint and a feedback signal, and a proportional plus integral plus derivative (PID) controller 74a, 74b, 74c for generating control signals. The control loops also can include dual feedback functionality (e.g., both position and velocity loops), velocity feedforward, and acceleration feedforward parameters. The control loops create a command signal based on the setpoint provided by the virtual motion section 52 and feedback signals from the feedback devices 26a, 26b, 26c. The output of each PID controller is provided to a respective drive 22a, 22b, 22c, which then provides power to the motor 24a, 24b, 24c based on the output, as is conventional.

In accordance with the invention, the skew generator 56 receives the virtual master reference from the virtual motion section 52 for the master sections (e.g., the virtual master references for the X-axis 16 and Y-axis 18 in the present example), and introduces a delay or skew into virtual master reference. The delay or skew acts so as to shift the virtual master reference in time such that the output of the skew generator 56 lags the input by a predetermined delay. The actual delay is application specific, and can be on the order of a few milliseconds to few seconds. The slave section, however, receives the virtual slave reference without passing through the skew generator 56 (or by passing the virtual reference through the skew generator but with a delay less than that applied to the master section). Accordingly, the slave section receives a reference signal that leads the reference received by the master section.

Thus, the motion profile executed by the master sections (the X-axis 16 and Y-axis 18) are time shifted with respect to the motion profile executed by the slave section (the pump axis 20). As a result, the slave section can project the velocities or motions of the master sections in advance and start correcting for extrusion rate before the master sections actually execute the velocity or motion changes. In other words, the slave section (the pump axis 20) actually leads the master section (the X and Y-axis 16, 18).

It is noted that in deriving the actual slave reference, the skew generator may introduce a delay into the virtual slave reference, provided the delay is less than the delay introduced into the virtual master reference. For clarity, the remainder of the disclosure will refer to the generation of the actual slave reference without the introduction of a delay into the virtual slave reference. Such embodiments, however are contemplated by the present invention.

By providing the master sections with a time shifted version of the virtual master reference and providing the slave sections with a non-time shifted version of the virtual slave reference, the slave sections perform their motion profile in advance of the master sections. This permits the slave sections to begin compensating for dynamic delays in the system prior to the dynamic delays actually occurring. As a result, the performance of the system is improved.

The skew function can be implemented in a number of different ways. For example, the skew function can be implemented using a first-in first-out (FIFO) buffer. As the virtual master reference data enters the FIFO, the data is shifted toward the output of the FIFO each clock cycle until the data arrives at the output of the FIFO some time later. Thus, the FIFO introduces a time lag between its input and its output. The length of the time is dependent on the number of stages of the FIFO as well as the clock period. Utilizing a FIFO as the skew generator is advantageous in that a FIFO requires very little processor overhead and, thus, can be executed in real time. For example, the trajectory can be interpolated at 100 micro-seconds or less with a jitter of less than 100 nano-seconds. Further, the FIFO can handle complex linear or non-linear motion profiles.

Another approach for implementing the skew function includes filtering the data (e.g., a lag function or the like) as it enters the skew generator 56. However, the lag function can require more processor overhead to implement than the FIFO implementations. Further, the lag function may slightly distort the motion path, thereby reducing the accuracy of the motion system.

Another approach for implementing the skew function includes using an extrapolating estimator, which predicts the master motion in advance. Using the predicted motion, the slave can perform corrections, thereby improving system performance. Like the lag function, however, the extrapolating estimator can require more processor overhead than the FIFO implementation.

Figure 3A:
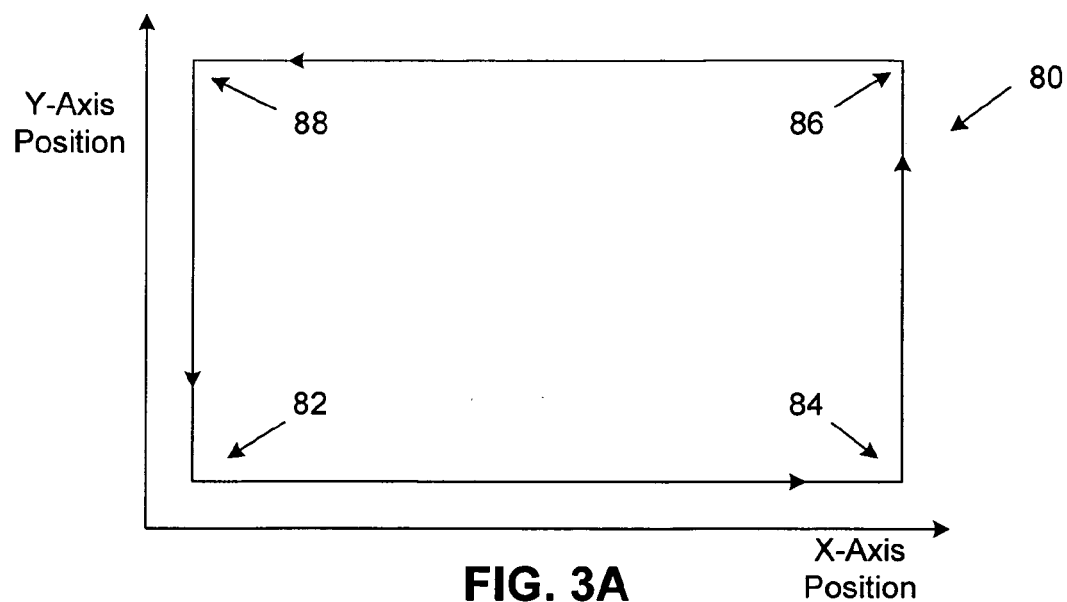
FIG. 3A illustrates a motion pattern that may be implemented by a multi-axis system.

FIG. 3A illustrates a pattern 80 executed by the gantry 12 in tracing a rectangular box, for example. As the gantry 12 begins tracing the pattern 80 at a first corner 82, the vector velocity of the gantry increases until a preset velocity is achieved. This velocity is maintained until the gantry approaches a second corner 84 of the box, wherein the velocity decreases as the gantry changes its direction (e.g., horizontal motion to vertical motion). As the gantry 12 begins the vertical motion, the vector velocity of the gantry again increases until the preset speed is achieved. This process of accelerating/steady state/decelerating continues as the gantry 12 approaches and departs from the remaining corners 86, 88 of the box.

Figure 3B:
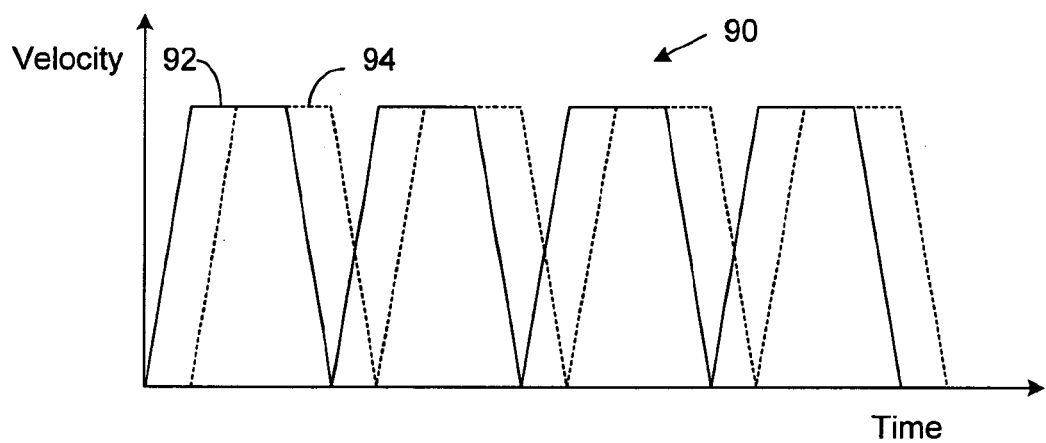
FIG. 3B is a graph illustrating a velocity profile of a master-slave multi-axis system utilizing the controller of FIG. 2 while implementing the motion pattern of FIG. 3A.

FIG. 3B illustrates a velocity profile 90 of the pump 14 (slave section) with respect to the vector velocity of the gantry 12 (master section) as the gantry performs the motion pattern 80 of FIG. 3A. As can be seen in FIG. 3B, the velocity 92 of the pump 14 leads the vector velocity 94 of the gantry 12, despite the fact that the pump 14 is a slave of the gantry 12. As a result, the slave section can react prior to the master section's actions, thereby compensating for inherent delays in the process, e.g., glue extrusion delays.

Additionally, and as was noted above, the skew generator 56 can be different for each section. For example, the skew generator for the X-axis 16 can be configured to have a preset delay "N", while the skew value for the Y-axis 18 can be configured to have a preset delay "N+1".

Further, the skew generator 56 can be enabled or disabled on the fly, i.e., without stopping or shutting down the system. Additionally, the delay time introduced by the skew generator 56 also can be changed on the fly.

For example, based on certain criteria (e.g., glue type), a signal can be provided to the motion controller that enables/disables the skew generator 56. Similarly, based on certain criteria, the amount of delay introduced by the skew generator 56 also can be varied. These features are useful, for example, when a system is required to utilize multiple products, such as a first glue that has a lower viscosity than a second glue. The dynamic delay of the second glue (the higher viscosity glue) typically would be higher than that of the first glue (the lower viscosity glue). By varying the delay time introduced by the skew generator 56 and/or enabling/disabling the skew generator 56, multiple products can be used in the system without the need for reconfiguring each time a product change is required.

Figure 4:
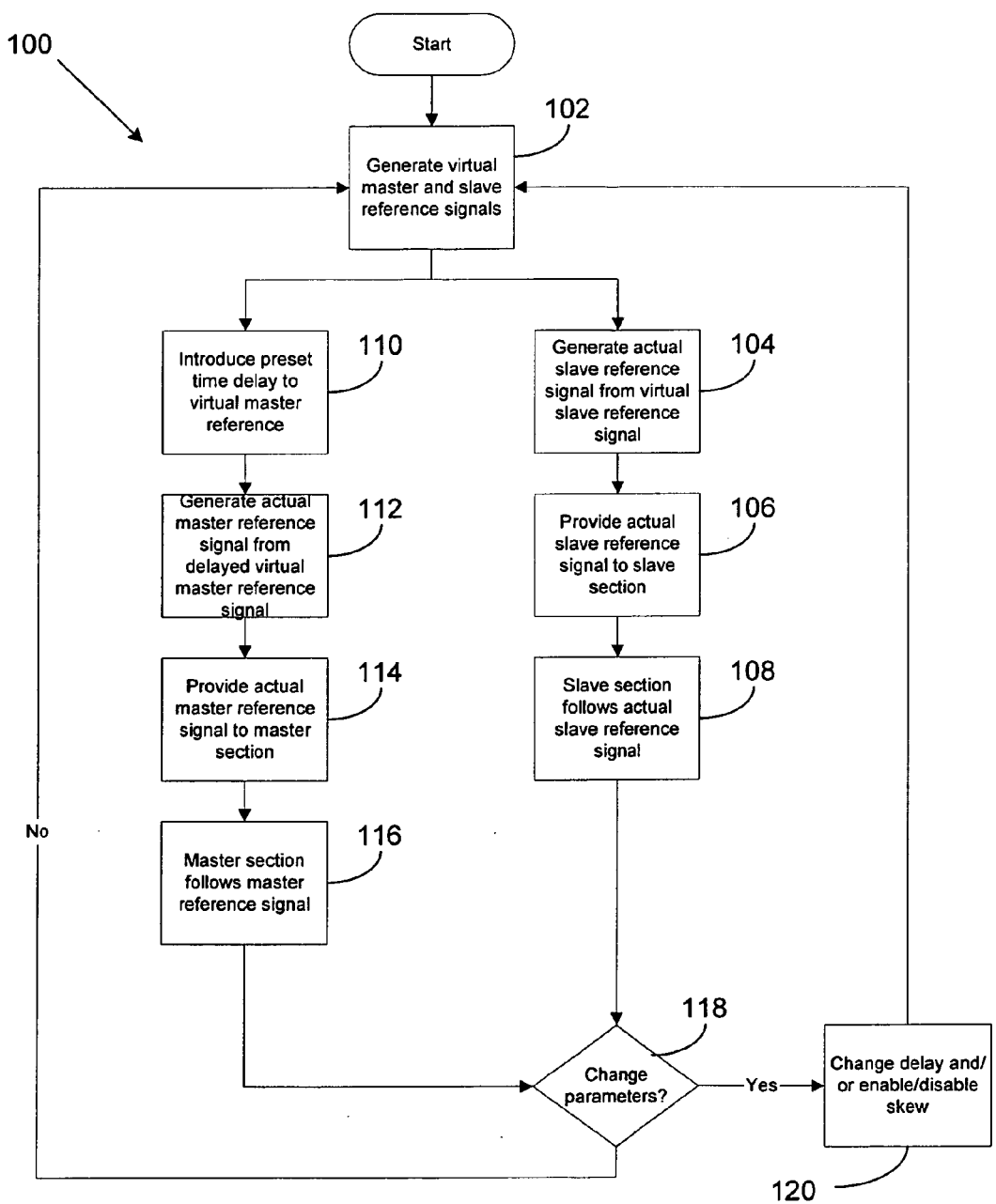
FIG. 4 is a flow diagram illustrating the steps for carrying out a method for generating a master and slave reference in accordance with an embodiment of the invention.

Moving now to FIG. 4, a flow diagram 100 illustrating the method of generating a master-slave reference in accordance with the invention is shown. The flow diagram includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 102, a virtual motion reference is generated by the motion controller for the master and slave sections. Applying the conventional approach wherein the slave reference is a function of the master reference, the virtual slave reference is a function of the virtual master reference, e.g., the virtual slave reference can be a ratio, draw, function, etc., of the virtual master reference.

In generating the virtual master and slave references, the motion controller 34 can utilize a trajectory generator 56 to generate the references. As will be appreciated by those skilled in the art, the trajectory generator 56 receives one or more motion parameters (e.g., velocity, position, acceleration, etc.) from a user and, based on these parameters, generates one or more motion setpoints. A continuous or smooth curve then is obtained by interpolating between the individual motion setpoints using any one of a number of different interpolation methods, including, for example, linear or circular NURBS, SPLINES, CAM, GEAR or JOG functions. The interpolation an be carried out by an axis interpolation section 66a, 66b, 66c, for example.

Moving to step 104, an actual slave reference is generated from the virtual slave reference. In the exemplary embodiment of FIG. 2, the actual slave reference is the same as that virtual slave reference (i.e., they are equal). It should be appreciated, however, that some scaling or manipulation may be applied to the virtual slave reference to obtain the actual slave reference. Next, at step 106, the actual slave reference is provided to the slave control loop 70c, which proceeds to regulate the slave section so as to satisfy the control loop 70c, as indicated at step 108.

Steps 110–116 are performed in parallel with steps 104–108. At step 110, a time delay is introduced to the virtual master reference. The time delay can be introduced using a FIFO, as discussed above. The actual delay implemented is application specific, and can range from a few milliseconds to a few seconds. At step 112, an actual master reference is generated based on the output of the FIFO. Since the output of the FIFO is a delayed version of the virtual master reference, the actual master reference is substantially the same as the virtual master reference, but shifted in time so as to lag the virtual master reference. Next, at step 114, the actual master reference is provided to the master control loops 70a, 70b, which proceed to regulate the master sections so as to satisfy the control loop, as indicated at step 116.

At step 118, it is determined if parameters are to be changed. If parameters will not be changed, then the method moves back to step 102. If parameters will be changed, then the method moves to step 120, wherein a parameter such as the delay time or skew enable/disable may be changed. Then the method moves back to step 102.

Accordingly, the master section follows an actual master reference, which is derived by introducing a delay into a virtual master reference. The slave section follows an actual slave reference, which is indirectly derived from the virtual master reference, but time shifted with respect to the actual master reference. As a result, the slave section leads the master sections, thereby allowing the slave section to anticipate the motion or velocities of the master sections. This permits the slave section to compensate for dynamic delays in the process or system.

The above described methodology can be implemented by a computer program which, when it is executed by computer system 34 performs one or more of the method steps described above.

Figure 5:
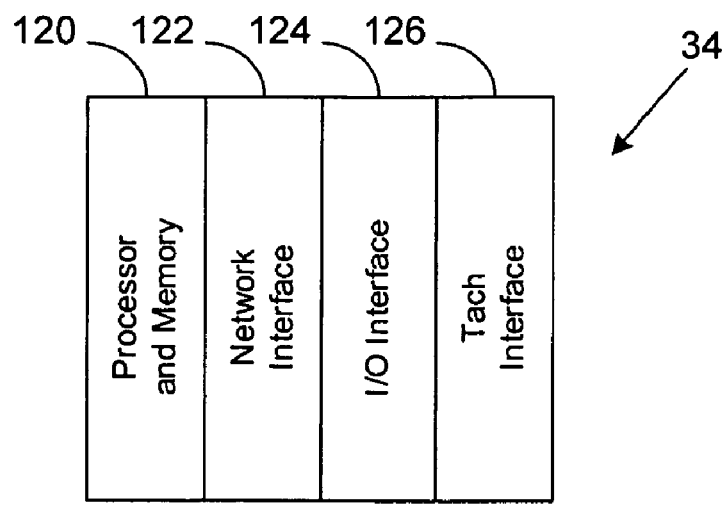
FIG. 5 is a block diagram of a motion controller that can be used in conjunction with the present invention.

Moving to FIG. 5, the motion controller 34 for executing the controller 50 in accordance with the present invention is illustrated. The motion controller 34 includes a processor and memory 120. The processor may be any conventional processor used in motion control systems. The memory can include RAM, ROM, EPROM, EEPROM, magnetic storage devices, optical storage devices, or the like. A network interface 122 allows the motion controller 34 to communicate with devices external to the motion controller 34, such as programable logic controllers (PLCs), computers, etc. An input/output (I/O) interface 124 accepts digital and analog I/O for interfacing with the system 10. The motion controller 34 also can include an feedback interface for receiving data from an encoder or the like. As will be appreciated, the motion controller may include a number of different modules as required by the specific application.

The actual code for performing the functions described herein can be readily programmed by a person having ordinary skill in the art of computer programming in any of a number of conventional programming languages based on the disclosure herein. Consequently, further detail as to the particular code itself has been omitted for sake of brevity. As will be appreciated, the various computer codes for carrying our the processes herein described can be embodied in computer-readable media.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A motion control system for generating a master and slave reference for a plurality of axes, wherein at least one axis of the plurality of axes is a master section and at least one axis of the plurality of axes is a slave section, said slave section being a slave of said master section, comprising:
a processor that generates a first reference signal and a second reference signal, wherein the second reference signal lags the first reference signal by a first delay period, and the processor provides the first reference signal to the slave section and the second reference signal to the master section, whereby the slave section leads the master section.

2. The system of claim 1, wherein prior to providing the first reference signal to the slave section, the processor conditions the first reference signal.

3. The system of claim 2, wherein conditioning the first reference signal includes applying at least on of a function, ratio or draw to the first reference signal.

4. The system of claim 1, wherein the at least one slave section is a plurality of slave sections, and the processor generates a third reference signal to other of the plurality of slave sections, wherein the third reference signal may or may not be derived from the first reference signal.

5. The system of claim 1, further comprising a first in, first out (FIFO) buffer, said FIFO receiving the first reference signal and generating the second reference signal.

6. The system of claim 1, wherein the processor generates a plurality of reference signals from the first reference signal, wherein each reference signal of the plurality of reference signals is derived by introducing a second delay period into the first reference signal such that each of the plurality of reference signals is time-shifted from the first reference signal, the second delay period being different from the first delay period.

7. The system of claim 6, wherein the second delay period is different for at least one of the plurality of reference signals from that of the other of the plurality of reference signals.

8. The system of claim 1, wherein the processor enables or disables the delay signal on the fly, such that when the introduction of the first delay signal is disabled, the second reference signal is substantially the same as the first reference signal.

9. The system of claim 8, wherein the delay period is enabled or disabled based on a specified criteria.

10. The system of claim 1, wherein the processor dynamically changes the first delay period.

11. The system of claim 10, wherein the delay period is changed based on a specified criteria.

12. A method of developing reference signals in a motion control system having a plurality of axes, wherein at least one axis of the plurality of axes is a master section and at least one axis of the plurality of axes is a slave section, said slave section being a slave of said master section, comprising the steps of:
generating a first reference signal;
generating a second reference signal from the first reference signal, wherein the second reference signal lags the first reference signal by a predetermined delay; and
providing the first reference signal to the at least one slave section and the second reference signal to the at least one master section, whereby the slave section leads the master section.

13. The method of claim 12, further comprising the step of conditioning the first reference signal prior to providing the first reference signal to the slave section.

14. The method of claim 13, wherein the step of conditioning includes the step of applying at least on of a function, ratio or draw to the first reference signal.

15. The method of claim 12, wherein the at least one slave section is a plurality of slave sections, further comprising the step of providing a third reference signal to other of the plurality of slave sections, wherein the third reference signal may or may not be derived from the first reference signal.

16. The method of claim 15, further comprising the step of generating a plurality of reference signals from the first reference signal, wherein each reference signal of the plurality of reference signals is derived by introducing a second delay period into the first reference signal such that each of the plurality of reference signals is time-shifted from the first reference signal, the second delay period being different from the first delay period.

17. The method of claim 16, wherein the step of introducing the second delay period includes using a delay period for one of the plurality of reference signals that is different from the delay period used for the other of the plurality of reference signals.

18. The method of claim 12, wherein the step of introducing the first delay period includes the step of using a first in, first out (FIFO) buffer to introduce the delay period.

19. The method of claim 12, further comprising the step of enabling or disabling the delay signal on the fly, such that when the introduction of the first delay signal is disabled, the second reference signal is substantially the same as the first reference signal.

20. The method of claim 19, wherein the step of enabling or disabling includes enabling or disabling the delay period based on a specified criteria.

21. The method of claim 12, further comprising the step of dynamically changing the first delay period.

22. The method of claim 21, wherein the step of dynamically changing the first delay period includes changing the delay period based on a specified criteria.

* * * * *